(12) United States Patent
Vo et al.

(10) Patent No.: US 9,038,717 B2
(45) Date of Patent: May 26, 2015

(54) METHODS OF TRANSPORTING PROPPANT PARTICULATES IN A SUBTERRANEAN FORMATION

(71) Applicant: Halliburton Energy Services, Inc., Houston, TX (US)

(72) Inventors: Loan K. Vo, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 198 days.

(21) Appl. No.: 13/788,132

(22) Filed: Mar. 7, 2013

(65) Prior Publication Data

US 2014/0251611 A1   Sep. 11, 2014

(51) Int. Cl.
*E21B 43/267* (2006.01)
*C09K 8/80* (2006.01)
*C09K 8/82* (2006.01)

(52) U.S. Cl.
CPC ............... *E21B 43/267* (2013.01); *C09K 8/82* (2013.01)

(58) Field of Classification Search
CPC ............................. E21B 43/267; C09K 8/80
USPC ............ 166/276, 281, 308.1, 308.2, 308.4, 166/280.2, 280.1
See application file for complete search history.

(56) References Cited

U.S. PATENT DOCUMENTS

| | | | |
|---|---|---|---|
| 5,833,000 A | 11/1998 | Weaver et al. | |
| 5,839,510 A | 11/1998 | Weaver et al. | |
| 5,853,048 A | 12/1998 | Weaver et al. | |
| 6,169,058 B1 * | 1/2001 | Le et al. | 507/222 |
| 6,287,639 B1 | 9/2001 | Schmidt et al. | |
| 6,439,309 B1 | 8/2002 | Matherly et al. | |
| 7,392,847 B2 | 7/2008 | Gatlin et al. | |
| 7,534,745 B2 | 5/2009 | Taylor et al. | |
| 7,819,192 B2 | 10/2010 | Weaver et al. | |
| 7,825,074 B2 | 11/2010 | Schmidt et al. | |
| 7,956,017 B2 | 6/2011 | Gatlin et al. | |
| 8,119,575 B2 | 2/2012 | Taylor et al. | |
| 2005/0244641 A1 | 11/2005 | Vincent | |
| 2006/0118301 A1 | 6/2006 | East et al. | |
| 2007/0131422 A1 | 6/2007 | Gatlin et al. | |
| 2007/0131425 A1 | 6/2007 | Gatlin et al. | |
| 2007/0155630 A1 | 7/2007 | Hoch et al. | |
| 2007/0187097 A1 * | 8/2007 | Weaver et al. | 166/280.2 |
| 2010/0163234 A1 | 7/2010 | Fuller et al. | |
| 2010/0267593 A1 | 10/2010 | Zhang | |
| 2012/0067575 A1 * | 3/2012 | Luyster et al. | 166/278 |
| 2012/0067584 A1 | 3/2012 | Zhang et al. | |

FOREIGN PATENT DOCUMENTS

WO        2014137904 A1    9/2014

OTHER PUBLICATIONS

International Search Report and Written Opinion for PCT/US2014/019913 dated Jun. 17, 2014.

* cited by examiner

*Primary Examiner* — Zakiya W Bates
*Assistant Examiner* — Silvana Runyan
(74) *Attorney, Agent, or Firm* — McDermott Will & Emery LLP; Craig W. Roddy

(57) ABSTRACT

Methods of treating a wellbore in a subterranean formation including providing an oil-external treatment fluid, wherein the oil-external treatment fluid is a 3D-network comprising a chemical interaction between a hydrocarbon fluid, an aqueous fluid, and a surface modification agent; providing proppant particulates; suspending the proppant particulates in the oil-external treatment fluid; and introducing the oil-external treatment fluid comprising the proppant particulates into the wellbore in the subterranean formation.

20 Claims, No Drawings

METHODS OF TRANSPORTING PROPPANT PARTICULATES IN A SUBTERRANEAN FORMATION

BACKGROUND

The present invention relates to methods of transporting proppant particulates in a subterranean formation.

Subterranean wells (e.g., hydrocarbon fluid producing wells and water producing wells) are often stimulated by hydraulic fracturing treatments. In a typical hydraulic fracturing treatment, a treatment fluid is pumped into a wellbore in a subterranean formation at a rate and pressure above the fracture gradient of the particular subterranean formation so as to create or enhance at least one fracture therein. Particulate solids (e.g., graded sand, bauxite, ceramic, nut hulls, and the like), or "proppant particulates," are typically suspended in the treatment fluid or a second treatment fluid and deposited into the fractures while maintaining pressure above the fracture gradient. The proppant particulates are generally deposited in the fracture in a concentration sufficient to form a tight pack of proppant particulates, or "proppant pack," which serves to prevent the fracture from fully closing once the hydraulic pressure is removed. By keeping the fracture from fully closing, the interstitial spaces between individual proppant particulates in the proppant pack form conductive pathways through which produced fluids may flow.

In traditional hydraulic fracturing treatments, the specific gravity of the proppant particulates may be high in relation to the treatment fluids in which they are suspended for transport and deposit in a target interval (e.g., a fracture). Therefore, the proppant particulates may settle out of the treatment fluid and fail to reach the target interval. For example, where the proppant particulates are to be deposited into a fracture, the proppant particulates may settle out of the treatment fluid and accumulate only or substantially at the bottommost portion of the fracture, which may result in complete or partial occlusion of the portion of the fracture where no proppant particulates have collected (e.g., at the top of the fracture). As such, fracture conductivity and production over the life of a subterranean well may be substantially impaired if proppant particulates settle out of the treatment fluid before reaching their target interval within a subterranean formation.

One way to compensate for proppant particulate settling is to introduce the proppant particulates into the fracture in a viscous gelled fluid. Gelled fluids typically require high concentrations of gelling agents and/or crosslinker, particularly when transporting high concentrations of proppant particulates in order to maintain them in suspension. As many gelling and crosslinking agents are used in a variety of fluids within and outside of the oil and gas industry, their demand is increasing while their supply is decreasing. Therefore, the cost of gelling and crosslinking agents is increasing, and consequently, the cost of hydraulic fracturing treatments requiring them is also increasing. Additionally, the use of gelling and crosslinking agents may result in premature viscosity increases that may cause pumpability issues or problems with subterranean operations equipment.

Another method of compensating for the settling nature of proppant particulates is the introduction of gas-generating mechanisms that introduce sufficient gas to increase proppant particulate buoyancy within the treatment fluid. However, the gas is often generated at unwanted intervals within the subterranean formation, thereby failing to adequately keep the proppant particulates suspended in the treatment fluid until they reach the target interval. Additionally, gas may be generated partially at unwanted intervals and partially at the desired interval, such that the amount of gas generated at the desired interval is insufficient to increase the buoyancy of the proppant particulates to overcome settling forces.

The degree of success of a hydraulic fracturing operation depends, at least in part, upon fracture conductivity after the fracturing operation has ceased and production commenced. Therefore, a method of hindering the settling of proppant particulates in a treatment fluid may be of value to one of ordinary skill in the art.

SUMMARY OF THE INVENTION

The present invention relates to methods of transporting proppant particulates in a subterranean formation.

In some embodiments, the present invention provides a method comprising treating a wellbore in a subterranean formation comprising: providing an oil-external treatment fluid, wherein the oil-external treatment fluid is a 3D-network comprising a chemical interaction between a hydrocarbon fluid, an aqueous fluid, and a surface modification agent; providing proppant particulates; suspending the proppant particulates in the oil-external treatment fluid; and introducing the oil-external treatment fluid comprising the proppant particulates into the wellbore in the subterranean formation.

In other embodiments, the present invention provides a method comprising treating a wellbore in a subterranean formation comprising: providing an oil-external treatment fluid, wherein the oil-external treatment fluid is a 3D-network comprising a chemical interaction between a hydrocarbon fluid, an aqueous fluid, and a surface modification agent coated onto proppant particulates; and introducing the oil-external treatment fluid into the wellbore in the subterranean formation.

In still other embodiments, the present invention provides a method comprising treating a wellbore in a subterranean formation comprising: providing a hydrocarbon fluid; providing aqueous fluid; providing a surface modification agent; providing proppant particulates; providing a hydrojetting tool connected to a tubular member within the wellbore in the subterranean formation, so as to create an annulus between the tubular member and the wellbore in the subterranean formation; introducing the surface modification agent into the hydrocarbon fluid or the aqueous fluid; introducing the proppant particulates into the hydrocarbon fluid or the aqueous fluid; introducing one of the hydrocarbon fluid or the aqueous fluid into the wellbore in the subterranean formation through the hydrojetting tool and introducing the other of the hydrocarbon fluid or the aqueous fluid into the wellbore in the subterranean formation through the annulus between the tubular member and the wellbore in the subterranean formation; and contacting the hydrocarbon fluid and the aqueous fluid within the wellbore in the subterranean formation, so as to create an oil-external treatment fluid that is a 3D-network comprising a chemical interaction between the hydrocarbon fluid, the aqueous fluid, and the surface modification agent, wherein the oil-external treatment fluid is capable of suspending the proppant particulates.

The features and advantages of the present invention will be readily apparent to those skilled in the art upon a reading of the description of the preferred embodiments that follows.

DETAILED DESCRIPTION

The present invention relates to methods of transporting proppant particulates in a subterranean formation. Specifically, the present invention relates to transporting proppant particulates in a 3D-network oil-external treatment fluid comprising the chemical interaction between a hydrocarbon fluid, an aqueous fluid, and a surface modification agent.

The present invention is capable of suspending proppant particulates without the use of traditional viscosifying agents (e.g., gelling agents, foaming agents, gas-forming agents, and the like) that are typically required in treatment fluids used in subterranean formations. Therefore, the treatment fluids of the present invention may be easier to prepare, less expensive, and more versatile.

In some embodiments, the present invention provides a method of treating a wellbore in a subterranean formation comprising providing an oil-external treatment fluid, wherein the oil-external treatment fluid is a 3D-network comprising a chemical interaction between a hydrocarbon fluid, an aqueous fluid, and a surface modification agent. Proppant particulates are then suspended in the oil-external treatment fluid and introduced into the wellbore in the subterranean formation. The suspended proppant particulates are more or less homogeneously dispersed in the oil-external treatment fluid, ensuring their uniform placement in a target interval (e.g., a fracture).

The oil-external 3D-network treatment fluids of the present invention are comprised of a hydrocarbon fluid, an aqueous fluid, and a surface modification agent alone or coated onto a proppant particulate. The hydrocarbon fluids for use in the present invention may be any hydrocarbon fluid capable of use in a subterranean operation as a component of a treatment fluid. The hydrocarbon fluids may be simple or complex and may derive from organic or synthetic sources. Synthetic hydrocarbon fluids for use in the present invention may be derived from coal, natural gas, oil shale, or biomass, for example. Suitable hydrocarbon fluids for use in the oil-external treatment fluids of the present invention include, but are not limited to, a methane; a methene; a methyne; an ethane; an ethene; an entyne; a propane; a propene; a propyne; a cyclopropane; a proadiene; a butane; a butene; a butyne; a cyclobutane; a butadiene; a pentane; a pentene; a pentyne; a cyclopentane; a pentadiene; a hexane; a hexene; a hexyne; a cyclohexane; a hexadiene; a heptane; a heptene; a heptyne; a cycloheptane; a heptadiene; an octane; an octene; an octyne; a cyclooctane; an octadiene; a nonane; a nonene; a nonyne; a cyclononane; a nonadiene; a decane; a decene; a decyne; a cyclodecane; a decadiene; kerosene; diesel; petroleum; a paraffin solvent; a mineral oil; a cooking oil (e.g., vegetable oil, peanut oil, corn oil, canola oil, linseed oil, soybean oil, safflower oil, sunflower oil, palm oil, etc.); petrol; a benzene; biodiesel; a synthetic fuel; a crude oil; and any combinations thereof.

The hydrocarbon fluids of the present invention are capable of chemically interacting through, for example, van der Waals interactions with an aqueous fluid and the surface modification agent of the present invention. The interaction causes the creation of the 3D-network of the present invention that is capable of suspending proppant particulates therein. Aqueous fluids suitable for use in the oil-external treatment fluids of the present invention may include, but are not limited to, fresh water; saltwater (e.g., water containing one or more salts dissolved therein); brine (e.g., saturated salt water); seawater; or any combinations thereof. Generally, the aqueous fluid may be from any source, provided that it does not contain components that might adversely affect the stability and/or performance of the oil-external treatment fluids of the present invention. In certain embodiments, the density of the aqueous fluid can be adjusted, among other purposes, to provide additional proppant particulate transport and suspension in the treatment fluid used in the methods of the present invention, based on the chemical interaction between the aqueous fluid, the hydrocarbon fluid, and the surface modification agent. In certain embodiments, the pH of the aqueous base fluid may be adjusted (e.g., by a buffer or other pH adjusting agent) for the same purpose. One of ordinary skill in the art, with the benefit of this disclosure, will recognize when such density and/or pH adjustments are appropriate. In some embodiments, the pH range may preferably be from about 4 to about 11.

In some embodiments, the aqueous fluid and the hydrocarbon fluid are present in a ratio of about 2:1 aqueous fluid:hydrocarbon fluid. In other embodiments, the aqueous fluid and the hydrocarbon fluid are present in a ratio of about 4:1 aqueous fluid:hydrocarbon fluid. In still other embodiments, the aqueous fluid and the hydrocarbon fluid are present in a ratio of about 9:1 aqueous fluid:hydrocarbon fluid. Typically, in those embodiments where a large concentration of proppant particulates is to be suspended in the oil-external treatment fluids of the present invention, a greater aqueous fluid:hydrocarbon fluid ratio is preferred. The stability of the 3D-network of the present invention is temperature dependent. Typically, as temperature increases above ambient temperature, the 3D-network becomes less stable. One of ordinary skill in the art, with the benefit of this disclosure, may adjust the ratio of aqueous fluid to hydrocarbon fluid to counteract at least some of the destabilizing effects of increased temperature.

The surface modification agent of the present invention may be introduced into the oil-external treatment fluids either alone of after being coated onto proppant particulates. The surface modification agent may serve, among other things, to stabilize the oil-external treatment fluid to maintain its 3D-network and homogeneously suspend proppant particulates. Suitable surface modification agents for use in the methods of the present invention may include, but are not limited to, non-aqueous tackifying agents; aqueous tackifying agents; silyl-modified polyamide compounds; surface modification agent emulsions; and binders. Combinations and/or derivatives of these also may be suitable. The type and amount of surface modification agent included in a particular method of the present invention may depend upon, among other factors, the composition and/or temperature of the subterranean formation, the chemical composition of hydrocarbon fluid used, the type of aqueous fluid used, the type and size of proppant particulates to be suspended, and the like. Furthermore, the concentration of the surface modification agent can be varied, inter alia, to either enhance the 3D-network stability of the oil-external treatment fluids of the present invention or to enhance coating of the surface modification agent onto proppant particulates. In some embodiments, the surface modification agent of the present invention may be present in a range from about 0.01% to about 10% by weight of the oil-external treatment fluid. In other embodiments, the surface modification agent of the present invention may be present in a range from about 0.1% to about 3% by weight of the oil-external treatment fluid. It is within the ability of one skilled in the art, with the benefit of this disclosure, to determine the type and amount of surface modification agent to include in the methods of the present invention to achieve the desired results.

In some embodiments of the present invention, the surface modification agent may comprise a non-aqueous tackifying agent. A particularly preferred group of non-aqueous tackifying agents comprises polyamides that are liquids or in solution at the temperature of the subterranean formation such that they are, by themselves, nonhardening when introduced into the subterranean formation. A particularly preferred product is a condensation reaction product comprised of a polyacid and a polyamine (e.g., compounds such as combinations of dibasic acids containing some trimer and higher oligomers and also small amounts of monomer acids that are reacted with polyamines). Polyacids may include, but are not limited to, trimer acids; synthetic acids produced from fatty acids; maleic anhydride; acrylic acid; and any combination thereof.

Additional compounds which may be used as non-aqueous tackifying agents include liquids and solutions of, for example, polyesters; polycarbonates; polycarbamates; urethanes; natural resins (e.g., shellac); and the like. Combinations of these may be suitable as well.

Other suitable non-aqueous tackifying agents are described in U.S. Pat. Nos. 5,853,048 and 5,833,000, and U.S. Patent Publication Nos. 2007/0131425 and 2007/0131422, the entire disclosures of which are herein incorporated by reference. An example of a suitable commercially available non-aqueous tackifying agent is the non-aqeuous SANDWEDGE® Enhancement System available from Halliburton Energy Services in Houston, Tex., including, but not limited to, SANDWEDGE®; SANDWEDGE® WF; SANDWEDGE® NT; SANDWEDGE® OS; and ARCTIC SANDWEDGE®.

When the surface modification agent of the present invention is a non-aqueous tackifying agent that is coated onto a proppant particulate, the non-aqueous tackifying agents suitable for use in the present invention may either be used such that they form a nonhardening coating on a surface of the proppant particulate alone or they may be combined with a multifunctional material capable of reacting with the non-aqueous tackifying agent to form an enhanced hardened coating. As used herein, the term "hardened coating" refers to a substantially non-flowable material that exhibits a higher compressive strength in a consolidated agglomerate than the tackifying compound alone with the particulates. In this instance, the non-aqueous tackifying agent may function similarly to a hardenable resin.

Multifunctional materials suitable for use in the present invention with the non-aqueous tackifying agent to form an enhanced hardened coating include, but are not limited to, aldehydes; dialdehydes (e.g., glutaraldehyde, hemiacetals, or aldehyde releasing compounds); diacid halides; dihalides (e.g., dichlorides and dibromides); polyacid anhydrides; epoxides; furfuraldehyde; aldehyde condensates; and silyl-modified polyamide compounds; and combinations thereof. Suitable silyl-modified polyamide compounds that may be used in the present invention are those that are substantially self-hardening compositions capable of at least partially adhering to the proppant particulates of the present invention in the unhardened state, and that are further capable of self-hardening themselves to a substantially non-tacky state. Such silyl-modified polyamides may be based, for example, on the reaction product of a silating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

In some embodiments of the present invention, the multifunctional material may be mixed with the non-aqueous tackifying agent in an amount of about 0.01% to about 50% by weight of the non-aqueous tackifying agent to effect formation of the reaction product. In other embodiments, the multifunctional material is present in an amount of about 0.5% to about 1% by weight of the non-aqueous tackifying agent. Suitable multifunctional materials are described in U.S. Pat. No. 5,839,510, the entire disclosure of which is herein incorporated by reference.

Silyl-modified polyamide compounds may be described as substantially self-hardening compositions that are capable of at least partially adhering to the proppant particulates of the present invention in the unhardened state, and that are further capable of self-hardening themselves to a substantially non-tacky state to which individual particles such as formation fines will not adhere to, for example, in formation or proppant pack pore throats. Such silyl-modified polyamides may be based, for example, on the reaction product of a silating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, the entire disclosure of which is herein incorporated by reference.

Other binders suitable for using the present invention may generally comprise:
(I) a consolidant comprising a hydrolyzate or precondensate of:
(a) at least one organosilane of the general formula (I):

$$R_nSiX_{4-n} \tag{I}$$

in which the R radicals are the same or different and are each hydrolytically non-removable groups, the X radicals are the same or different and are each hydrolytically removable groups or hydroxyl groups and n is 1, 2 or 3, (b) optionally at least one hydrolyzable silane of the general formula (II)

$$SiX_4 \tag{II}$$

in which the X radicals are each as defined above, and
(c) at least one metal compound of the general formula (III)

$$MX_a \tag{III}$$

in which M is a metal of main groups I to VIII or of transition groups II to VIII of the Periodic Table of the Elements including boron, X is as defined in formula (I), where two X groups may be replaced by one oxo group, and a corresponds to the valence of the element, where the molar ratio of silicon compounds used to metal compounds used is in the range from 8000:1 to 8:1,
is infiltrated or injected into the geological formation and,
(II) the consolidant is cured under elevated pressure and elevated temperature,
where the consolidant also comprises an oleophobic and hydrophobic component. Comprehensive investigations have shown that these consolidants are not decomposed even in autoclaves at high pressure and high temperature even over a prolonged period, and also still form a stable bond under these conditions. In the case of use of a wetting-regulating consolidation variant, it was shown that the wetting behavior established is retained after a hydrothermal treatment in corrosive medium. The consolidation also reduces the porosity only to a slight degree.

Such binders are described in more detail in U.S. Pat. Nos. 7,825,074 and 6,287,639, the entire disclosures of which are hereby incorporated by reference.

Suitable silicon-based binders include polysiloxanes, which are liquid substances having low viscosity, excellent curing workability, and excellent heat resistance once cured. Suitable polysiloxanes may be obtained by hydrolysis and polycondensation of a silicon compound having three hydrolyzable groups, a silicon compound having two hydrolyzable groups, and a silicon compound having one hydrolyzable group. Suitable polysiloxanes have a hydrosilylatable carbon-carbon unsaturated group, a hydrosilyl group (a group containing Si—H bond) and an alkoxysilyl group, have a number-average molecular weight of 500 to 20,000, and is obtained by conducting a hydrolysis and polycondensation reaction of a silicon compound (T) having three hydrolyzable groups, a silicon compound (D) having two hydrolyzable groups, and a silicon compound (M) having one hydrolyzable group. The polysiloxane of the present invention is a compound that has a silsesquioxane unit (hereinafter referred to as a "structural unit T") deriving from the silicon compounds (T), (D) and (M), a silicone unit (hereinafter referred to as a "structural unit D"), and a monofunctional siloxane unit (hereinafter referred to as a "structural unit M").

At least one compound of the silicon compound (T), the silicon compound (D), and the silicon compound (M) has a hydrosilyl group among the silicon compounds (T), (D) and (M), and at least one compound of the silicon compound (T), the silicon compound (D), and the silicon compound (M) has a hydrosilylatable carbon-carbon unsaturated group. This unsaturated group usually binds to a silicon atom and is an organic group having carbon atoms of 2 to 10 containing a double bond or a triple bond. Specific examples of the unsaturated group include, but are not limited to, a vinyl group; an ortho styryl group; a meta styryl group; a para styryl group; an acryloyl group; a methacryloyl group; an acryloxy group; a methacryloxy group; a 1-propenyl group; a 1-butenyl group; a 1-pentenyl group; a 3-methyl-1-butenyl group; a phenylethenyl group; an ethynyl group; a 1-propynyl group; a 1-butynyl group; a 1-pentinyl group; a 3-methyl-1-butynyl group; a phenylbutynyl group; and the like. The silicon compound having the unsaturated group may have only one unsaturated group or two or more unsaturated groups. In the case where the compound has two or more unsaturated groups, the unsaturated groups may be the same or different from each other. Additionally, the two or more unsaturated groups may be bound to the same silicon atom or to a plurality of silicon atoms. It is noted that when a polysiloxane obtained using a silicon compound in which the unsaturated group is bound to the same silicon atom is subjected to curing, an unreacted vinyl group may easily remain due to steric hindrance, and heat resistance might become insufficient. Therefore, the silicon compound having the unsaturated group is preferably a compound in which one unsaturated group is bound to one silicon atom.

Other suitable silicon-based binders include:
(a) a compound comprising a reactive group of formula (I):

$$-X-SiR''_x(OR')_{3-z} \quad (I)$$

wherein X comprises a hydrocarbon fluid chain; wherein x=0 to 2 and z=0 to 2; wherein R' and R'' comprises a hydrogen; a halogen; an amide; a hydrocarbon chain; a carboxy (e.g., acetoxy); an alkoxy (e.g., ethoxy, methoxy); a hydrocarbon chain comprising a heteroatom; and/or a hydrocarbon fluid chain comprising a carbonyl group, and wherein when x is 2, then each R'' may be the same (identical) or different, and wherein when z is 0 or 1, then each R' may be the same or different; and, (b) a polysiloxane comprising a reactive functional group that comprises at least one of the following structural units (II):

$$R^1{}_n R^2{}_m SiO_{(4-n-m)/2} \quad (II)$$

wherein $R^1$ comprises hydrogen, hydroxyl, a hydrocarbon fluid chain, or a siloxane chain; wherein $R^2$ comprises a functional group; and wherein m and n fulfill the requirements of 0<n<4, 0<m<4 and 2<(m+n)<4; and wherein when n>1, then each $R^1$ may be the same or different; and wherein when m>1, then each $R^2$ may be the same or different. In certain embodiments, the functional group of $R^2$ comprises hydroxyl; carboxyl; isocyanate; blocked (poly)isocyanate; primary amine; secondary amine; amide; carbamate; urea; urethane; vinyl; unsaturated ester; maleimide; fumarate; anhydride; hydroxyl alkylamide; epoxy; and any combination thereof.

Other suitable silicon-based binders include (a) a compound comprising an organofunctional polysiloxane polymer as a binding agent obtaining the polymeric structure as part of a curing mechanism or a combination thereof. The curing mechanism of such siloxane coatings is a two step mechanism. First, a hydrolysable group attached to the silicon atom is split off in a reaction with water, to form a silanol. The silanol then reacts with another silanol in a condensation reaction to form a silicon-oxygen-silicon chemical bonding which is characteristic for siloxane coatings. The hydrolysable group can be a halogen; a ketoxime group; or an acetoxy group. A preferred hydrolysable group is an alkoxy group. Suitable silicon-based binders may comprise:

a) a polysiloxane having the formula:

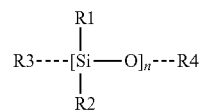

wherein, for each repeating polymer unit, R1, R2 and R3 are independently selected from the group consisting of alkyl, aryl, reactive glycidoxy groups having up to 20 carbon atoms, and $OSi(OR5)_3$ groups, wherein each R5 independently has the same meaning as R1, R2 or R3, and R4 is either alkyl, aryl, or hydrogen, and wherein n is selected so as that the molecular weight of the polysiloxane is in the range of 500 to 2000; and, b) an organo functional silane with two hydrolysable groups having the formula wherein R1 is selected from the group consisting of alkyl, aryl, reactive glycidoxy, amino, mercapto, vinyl, isocyanate or methacrylate groups having up to 20 carbon atoms; R2 is selected from the group consisting of reactive glycidoxy, amino, mercapto, vinyl, isocyanate or methacrylate groups having up to 20 carbon atoms; and R3 and R4 are halogen or alkoxy, ketoxime or acetoxy groups having up to six carbon atoms; wherein the coating composition has a solids content of at least 60% by weight.

Still other suitable silicon-based binders comprise a silane coupling agent and a polymer having a reactive silicon end group. In some embodiments, these suitable silicon-based binders may also include a catalyst operable to facilitate the curing of the polymer, a diluent, a dehydrating agent, and/or a filler material. Generally, any suitable polymer that can be prepared with reactive silicon end groups may be used, examples of suitable polymers include, but are not limited to, polyalkyls (e.g., polyethers, polyalkanes, polyalkenes, and polyalkynes); substituted alkyl monomers (e.g., styrene); acrylics; and any combination thereof. Examples of suitable reactive silicon end groups include, but are not limited to, triethoxysilanes; methyldiethoxysilanes; trisilanols; alkoxysilanes; substituted silanes; multi-silanols; and any combination thereof. One suitable polymer having a reactive silicon end group that may be used in particular embodiments of the present invention is a silane-modified poly(propylene oxide) oligomer.

Generally, any suitable silane coupling agent may be used in accordance with particular embodiments of the present invention. Examples of suitable silane coupling agents include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-am inopropyl-trimethoxysilanes; gamma-ureidopropyl-triethoxysilanes; beta-(3-4 epoxy-cyclohexyl)-ethyl-trimethoxysilane; gamma-glycidoxypropyl-trimethoxysilanes; vinyltrichlorosilane; vinyltris(beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyl-trimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltris(beta-methoxyethoxy) silane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-[3-(trimethoxysilyl)propyl]-ethylenediamine; substituted silanes where one or more of the substitutions contains a different functional group; and combinations thereof. In some embodiments, the silane coupling agent may be present in the curable adhesive composition in an amount from about 0.1% to about 5% by weight of the composition, and preferably in an amount from about 0.5% to about 3% by weight of the composition.

In some embodiments, the curable adhesive composition of the present invention may also comprise an optional catalyst to facilitate the curing of the adhesive composition. Generally, any suitable catalyst may be used in the curable adhesive compositions of the present invention. Examples of suitable catalysts include, but are not limited to, tertiary amine catalysts; titanium chelate catalysts; tin catalysts; lead catalysts; bismuth catalysts; and any combination thereof. One suitable catalyst that may be used in particular embodiments of the present invention is dibutylbis(2,4-pentanedionate-O,O')—, (OC-6-11). In some embodiments, the catalyst may be present in the curable adhesive composition in an amount from about 0.1% to about 5% by weight of the composition, and preferably in an amount from about 1% to about 3% by weight of the composition.

In some embodiments, the surface modification agent may comprise an aggregating composition which can modify the zeta potential or aggregation potential of a proppant particulate. Such modifications can permit any two surfaces (e.g., of proppant particulates, of a proppant particulate and a substrate, etc.) to have a greater attraction for one another.

Aggregating compositions suitable for use in the present invention include, but are not limited to, a reaction product of an amine and a phosphate ester, where the aggregating composition is designed to coat a surface with the reaction product to change the zeta potential or aggregation potential of the surface. Suitable aggregating compositions and their methods of use can be found in U.S. Pat. Nos. 7,392,847 and 7,956,017, the entire disclosures of which are hereby incorporated by reference.

Suitable amines include, but are not limited to, any amine that is capable of reacting with a suitable phosphate ester to form a composition that forms a deformable coating on a surface. Examples of such amines include, but are not limited to, any amine of the general formula $R_1, R_2NH$ or mixtures or combinations thereof, where $R_1$ and $R_2$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron; nitrogen; oxygen; phosphorus; sulfur; any mixture thereof; and any combination thereof, where one or more of the hydrogen atoms can be replaced by one or more single valence atoms selected from the group consisting of fluorine; chlorine; bromine; iodine; any mixture thereof; and any combination thereof. Exemplary examples of amines suitable for use in this invention include, but are not limited to, anilines; alkyl anilines; pyridines; alkyl pyridines; pyrroles; alkyl pyrroles; piperidines; alkyl piperidines; pyrrolidines; alkyl pyrrolidines; indoles; alkyl indoles; imidazoles; alkyl imidazoles; quinolines; alkyl quinolines; isoquinolines; alkyl isoquinolines; pyrazines; alkyl pyrazines; quinoxalines; alkyl quinoxalines; acridines; alkyl acridines; pyrimidines; alkyl pyrimidines; quinazolines; alkyl quinazolines; any mixture thereof; and any combination thereof.

Suitable phosphate esters include, but are not limited to, any phosphate ester that is capable of reacting with a suitable amine to form a composition that forms a deformable coating on a surface. Exemplary examples of such phosphate esters include, but are not limited to, any phosphate esters of the general formula $P(O)(OR^3)(OR^4)(OR^5)$ or mixture or combinations thereof, where $R^3$, $R^4$, and $OR^5$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron; nitrogen; oxygen; phosphorus; sulfur; any mixture thereof; and any combination thereof, where one or more of the hydrogen atoms can be replaced by one or more single valence atoms selected from the group consisting of fluorine; chlorine; bromine; iodine; any mixture thereof; and any combination thereof. Examples of phosphate esters include, but are not limited to, phosphate ester of alkanols having the general formula $P(O)(OH)_x(OR^6)_y$ where $x+y=3$ and are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron; nitrogen; oxygen; phosphorus; sulfur; any mixture thereof; and any combination thereof, and where one or more of the hydrogen atoms can be replaced by one or more single valence atoms selected from the group consisting of fluorine; chlorine; bromine; iodine; any mixture thereof; and any combination thereof, such as ethoxy phosphate; propoxyl phosphate; higher alkoxy phosphates; any mixture thereof; and any combination thereof. Other exemplary examples of phosphate esters include, but are not limited to, phosphate esters of alkanol amines having the general formula $N[R^7OP(O)(OH)_2]_3$ where $R^7$ is a carbenyl group having between about 1 and 40 carbon atoms and the required hydrogen atoms to satisfy the valence and where one or more of the carbon atoms can be replaced by one or more hetero atoms selected from the group consisting of boron; nitrogen; oxygen; phosphorus; sulfur; any mixture thereof; and any combination thereof, and where one or more of the hydrogen atoms can be replaced by one or more single valence atoms selected from the group consisting of fluorine; chlorine; bromine; iodine; any mixture thereof; and any combination thereof, such as tri-phosphate ester of tri-ethanol amine; any mixture thereof; and any combination thereof. Other examples of phosphate esters include, but are not limited to, phosphate esters of hydroxylated aromatics, such as phosphate esters of alkylated phenols such as nonylphenyl phosphate ester or phenolic phosphate esters. Other exemplary examples of phosphate esters include, but are not limited to, phosphate esters of diols and polyols, such as phosphate esters of ethylene glycol; propylene glycol; or higher glycolic structures. Other exemplary phosphate esters include, but are not limited to, any phosphate ester than can react with an amine and when coated on to a substrate forms a deformable coating enhancing the aggregating potential of the substrate.

In some embodiments, the surface modification agent may comprise a surface modification agent emulsion that comprises an emulsifying agent and a consolidating agent. The consolidating agent in suitable surface modification agent emulsions may be a non-aqueous tackifying agent. These surface modification agent emulsions have an aqueous external phase and organic-based internal phase. The term "emulsion" and any derivatives thereof as used herein refers to a combination of two or more immiscible phases and includes, but is not limited to, dispersions and suspensions.

Suitable surface modification agent emulsions comprise an aqueous external phase comprising the aqueous fluid of the present invention. One should note, however, that if long-term stability of the emulsion is desired, a more suitable aqueous fluid may be one that is substantially free of salts. It is within the ability of one skilled in the art, with the benefit of this disclosure, to determine if and how much salt may be tolerated in the surface modification agent emulsions of the present invention before it becomes problematic for the stability of the emulsion.

The consolidating agent in the emulsion may be a non-aqueous tackifying agent. The consolidating agents may be present in a surface modification agent emulsion in an amount in the range of about 0.1% to about 80% by weight of the surface modification agent emulsion composition. In some embodiments, the consolidating agent may be present in a surface modification agent emulsion in an amount in the range of about 0.1% to about 40% by weight of the composition. In some embodiments, the consolidating agent may be present in a surface modification agent emulsion in an amount in the range of about 0.1% to about 5% by weight of the composition. Additional details of surface modification agent emulsions may be found in U.S. Pat. No. 7,819,192, which is incorporated herein by reference.

As previously stated, the surface modification agent emulsions comprise an emulsifying agent. Examples of suitable emulsifying agents may include, but are not limited to, surfactants; proteins; hydrolyzed proteins; lipids; glycolipids; nanosized particulates (e.g., fumed silica); and any combination thereof.

In some embodiments, the present invention provides a method of introducing an oil-external emulsion treatment fluid into a subterranean formation using a hydrojetting tool such that the components of the oil-external treatment fluid do not form the 3D-network of the present invention until placed at a particular target interval. In these methods, the hydrojetting tool is connected to a tubular member within the wellbore of the subterranean formation so as to create an annulus between the tubular member and the wellbore in the subterranean formation. The surface modification agent of the present invention is placed into either a hydrocarbon fluid or an aqueous fluid. The proppant particulates of the present invention are placed in either the hydrocarbon fluid or the aqueous fluid, whichever does not contain the surface modification agent. Then either the hydrocarbon fluid or the aqueous fluid is placed within the wellbore in the subterranean formation through the hydrojetting tool and the other through the annulus between the tubular member and the wellbore, such that each are contacted at a target interval and the 3D-network of the present invention is formed. The combination of aqueous fluid, hydrocarbon fluid, surface modification agent, and proppant particulates and the mode in which they are introduced into the subterranean formation (e.g., through the hydrojetting tool or the annulus) may depend, inter alia, on the conditions of the subterranean formation, the type and amount of surface modification agent used, the type and size of proppant particulates used, and the like. It is within the skill of a person with ordinary skill in the art to determine what combination and mode of entry, with the benefit of this disclosure, may be beneficial for a particular application.

The applications in which the methods of the present invention may be used include any subterranean operation where suspending proppant particulates, or other solid particles, may be of benefit. In some embodiments, the oil-external treatment fluids of the present invention may be utilized to transport proppant particulates, coated or uncoated with the surface modification agent, into an at least one fracture within a subterranean formation. Therein, the proppant particulates may form a proppant pack capable of holding open the fracture during production of the well. In other embodiments, the oil-external treatment fluids of the present invention may be utilized in a gravel packing operation. In such circumstances, the oil-external treatment fluid comprising proppant particulates, either coated or uncoated with the surface modification agent, is introduced into a wellbore in a subterranean formation having a gravel packed screen therein in the annulus between the wellbore in the subterranean formation (e.g., the surface of the formation) and the gravel packing screen. In other embodiments, the oil-external treatment fluids of the present invention may be used as a pre-pad fluid or a pad fluid, which is substantially free of proppant particulates.

The proppant particulates for use in the methods of the present invention may comprise any material suitable for use in subterranean operations. Suitable materials for the proppant particulates include, but are not limited to, sand; bauxite; ceramic materials; glass materials; polymer materials; polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood; composite particulates; and any combination thereof. Suitable composite particulates may comprise a binder and a filler material wherein suitable filler materials include, but are not limited to, silica; alumina; fumed carbon; carbon black; graphite; mica; titanium dioxide; meta-silicate; calcium silicate; kaolin; talc; zirconia; boron; fly ash; hollow glass microspheres; solid glass; and any combination thereof.

The mean proppant particulate size generally may range from about 2 mesh to about 400 mesh on the U.S. Sieve Series; however, in certain circumstances, other mean proppant particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "proppant particulate," as used in this disclosure, includes all known shapes of materials, including substantially spherical materials; fibrous materials; polygonal materials (e.g., cubic materials); and any combination thereof. Moreover, fibrous materials, that may or may not be used to bear the pressure of a closed fracture, may be included in certain embodiments of the present invention. In certain embodiments, the particulates may be present in the oil-external treatment fluid of the present invention in an amount in the range of from about 0.5 pounds per gallon ("ppg") to about 30 ppg by volume of the treatment fluid.

In some embodiments of the present invention, a portion of the proppant particulates may be formed from degradable particles. This may be particularly beneficial in those methods of the present invention where the proppant particulates are placed within an at least one fracture in the wellbore in the subterranean formation so as to form a proppant pack. In some embodiments the degradable particles used are oil-degradable materials. Where such oil-degradable particles may be beneficial, such as in the event of crushed proppant particulates during fracture closure, for example, the oil-degradable particles may be degraded by the produced fluids, thus restoring at least some of the lost permeability. The degradable particles may also be degraded by materials purposely placed in the formation by injection, mixing the degradable particle with delayed reaction degradation agents, or other suitable means to induce degradation.

In some embodiments of the present invention, degradable particles may comprise at least a portion of the proppant particulates forming a proppant pack in a fracture. Thus, as the degradable particles are removed with time, the porosity of the propped fracture may increase. The degradable particles are preferably substantially uniformly distributed throughout the formed proppant pack. Over time, the degradable particles will degrade, in situ, causing the degradable particles to substantially be removed from the proppant pack and to leave behind voids in the proppant pack. These voids enhance the porosity of the proppant pack, which may result, in situ, in enhanced conductivity. In some embodiments, it may be desirable that the degradable particles have similar particle size, shape, and specific gravity as those of the proppant particulates to enhance the distribution of degradable particulate among the proppant particles and to minimize the segregation between the proppant particulates and the degradable particles.

Suitable degradable materials include oil-degradable polymers. Oil-degradable polymers that may be used in accordance with the present invention may be either natural or synthetic polymers. Some particular examples include, but are not limited to, polyacrylics; polyamides; polyolefins (e.g., polyethylene, polypropylene, polyisobutylene, and polystyrene); and any combination thereof. Other suitable oil-degradable polymers include those that have a melting point, which is such that the polymer will dissolve at the temperature of the subterranean formation in which it is placed such as a wax material.

In addition to oil-degradable polymers, other degradable particles that may be used in conjunction with the present invention include, but are not limited to, degradable polymers; dehydrated salts; and/or mixtures of the two. As for degradable polymers, a polymer is considered to be "degradable" herein if the degradation is due to, in situ, a chemical and/or radical process such as hydrolysis, oxidation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, for example, temperature, presence of moisture, oxygen, microorganisms, enzymes, pH, and the like.

Suitable examples of degradable polymers that may be used in accordance with the present invention include polysaccharides (e.g., dextran or cellulose); chitins; chitosans; proteins; aliphatic polyesters; poly(lactides); poly(glycolides); poly(ε-caprolactones); poly(hydroxybutyrates); poly(anhydrides); aliphatic or aromatic polycarbonates; poly(orthoesters); poly(amino acids); poly(ethylene oxides); polyphosphazenes; and any combination thereof. Of these suitable polymers, aliphatic polyesters and polyanhydrides may be preferred.

Polyanhydrides are another type of particularly suitable degradable polymer useful in the present invention. Polyanhydride hydrolysis proceeds, in situ, via free carboxylic acid chain-ends to yield carboxylic acids as final degradation products. The erosion time can be varied over a broad range of changes in the polymer backbone. Examples of suitable polyanhydrides include, but are not limited to, poly(adipic anhydride); poly(suberic anhydride); poly(sebacic anhydride); poly(dodecanedioic anhydride); poly(maleic anhydride); poly(benzoic anhydride); and any combination thereof.

Dehydrated salts may be used in accordance with the present invention as a degradable particle. A dehydrated salt is suitable for use in the present invention if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax); anhydrous boric acid; and any combination thereof. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable materials may also be suitable as the degradable particles for use in the methods of the present invention. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

In choosing the appropriate degradable material, one should consider the degradation products that will result. These degradation products should not adversely affect other operations or components and may even be selected to improve the long term performance/conductivity of the propped fracture. The choice of degradable material also can depend, at least in part, on the conditions of the well (e.g., well bore temperature). For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

In some embodiments, a preferable result is achieved if the degradable particles degrade slowly over time as opposed to instantaneously. Even more preferable results have been obtained when the degradable particles do not begin to degrade until after a proppant pack has developed some compressive strength. The slow degradation of the degradable material, in situ, helps to maintain the stability of a proppant pack.

In some embodiments of the present invention, from about 10% to about 90% of the total proppant particulates used in the methods of the present invention are degradable particles. In other embodiments, from about 20% to about 70% of the total proppant particulates used in the methods of the present invention are degradable particles. In still other embodiments, from about 25% to about 50% of the total proppant particulates used in the methods of the present invention are degradable particles. One of ordinary skill in the art, with the benefit of this disclosure, will recognize an optimum concentration of degradable particles that provides desirable values in terms of enhanced conductivity or permeability without undermining the stability of the high porosity fracture itself.

To facilitate a better understanding of the present invention, the following examples of preferred or representative embodiments are given. In no way should the following examples be read to limit, or to define, the scope of the invention.

EXAMPLE 1

Four oil-external treatment fluids were prepared using 90:10 ratio of water:crude oil and 1.5% by weight of the fluid composition of SandWedge® WF in glass vials. To the each of the four oil-external treatment fluids, 1 pounds per gallon ("ppg"), 3 ppg, 6 ppg, or 8 ppg of 20/40-mesh Brady sand was added and vigorously mixed. The glass vials containing the oil-external treatment fluids were maintained at ambient temperature for 4 hours. Every 30 minutes, each vial was visually inspected for suspension capability of the Brady sand. After 4 hours, the vials containing the higher concentration of Brady sand (6 ppg and 8 ppg) exhibited greater suspendability and stability of suspension than the vials having a lesser concentration of Brady sand. Thereafter, the glass vials were heated to 180° F., and the Brady sand in each vial was observed to fall out of the fluid (e.g., the oil-external treatment fluid could no longer suspend the sand) after the elapse of about 30 minutes.

Therefore, in a treatment operation requiring a high concentration of proppant particulates, the oil-external treatment fluids of the present invention may preferably have a large ratio differential between the aqueous fluid and the hydrocarbon fluid. Additionally, heating the oil-external treatment fluids of the present invention, as may occur within a subterranean formation, may cause the treatment fluids to "break" after the proppant particulates are delivered to a target interval (e.g., a fracture), thereby reducing the viscosity of the fluid and allowing it to be circulated out of the wellbore in the subterranean formation.

EXAMPLE 2

Four oil-external treatment fluids were prepared using 80:20 ratio of water:crude oil and 1.5% by weight of the fluid composition of SANDWEDGE® WF in glass vials. To each of the four oil-external treatment fluids, 1 parts-per-gallon ("ppg"), 3 ppg, 6 ppg, or 8 ppg of 20/40-mesh Brady sand was added and vigorously mixed. The glass vials containing the oil-external treatment fluids were maintained at ambient temperature for 4 hours. Every 30 minutes, each vial was visually inspected for suspension capability of the Brady sand. After 4 hours, the vials containing the lesser concentration of Brady sand (1 ppg and 3 ppg) exhibited greater suspendability and stability of suspension than the vials having a higher concentration of Brady sand. Thereafter, the glass vials were heated to 180° F., and the Brady sand in each vial was observed to fall out of the fluid (e.g., the oil-external treatment fluid could no longer suspend the sand) after the elapse of about 30 minutes.

Therefore, in a treatment operation requiring a lesser concentration of proppant particulates, the oil-external treatment fluids of the present invention may preferably have a smaller ratio differential between the aqueous fluid and the hydrocarbon fluid. Additionally, heating the oil-external treatment fluids of the present invention, as may occur within a subterranean formation, may cause the treatment fluids to "break" after the proppant particulates are delivered to a target interval (e.g., a fracture), thereby reducing the viscosity of the fluid and allowing it to be circulated out of the wellbore in the subterranean formation.

Thus, some embodiments of the present invention provide:

(A) Methods of transporting proppant particulates in a wellbore in a subterranean formation comprising providing an oil-external treatment fluid, wherein the oil-external treatment fluid is a 3D-network comprising a chemical interaction between a hydrocarbon fluid, an aqueous fluid, and a surface modification agent. Proppant particulates are suspended in the oil-external treatment fluid and introduced into the wellbore in the subterranean formation.

(B) Methods of transporting proppant particulates in a wellbore in a subterranean formation comprising providing an oil-external treatment fluid, wherein the oil-external treatment fluid is a 3D-network comprising a chemical interaction between a hydrocarbon fluid, an aqueous fluid, and a surface modification agent that has been coated onto proppant particulates. The oil-external treatment fluid containing the coated proppant particulates is then introduced into the wellbore in the subterranean formation.

(C) Methods of transporting proppant particulates comprising introducing an oil-external emulsion treatment fluid into a subterranean formation using a hydrojetting tool connected to a tubular member within the wellbore of the subterranean formation so as to create an annulus between the tubular member and the wellbore in the subterranean formation. A surface modification agent is placed into either a hydrocarbon fluid or an aqueous fluid. Proppant particulates are placed in either the hydrocarbon fluid or the aqueous fluid, whichever does not contain the surface modification agent. Then either the hydrocarbon fluid or the aqueous fluid is introduced into the wellbore in the subterranean formation through the hydrojetting tool and the other through the annulus between the tubular member and the wellbore, such that each are contacted at a target interval and a 3D-network is formed.

Each of embodiments A, B, and C (above) may have one or more of the following additional elements in any combination:

Element 1: A method wherein the chemical interaction between the hydrocarbon, the aqueous fluid, and the surface modification agent is a Van der Waals interaction.

Element 2: A method wherein the wellbore in the subterranean formation comprises at least one fracture and at least a portion of the proppant particulates suspended in the oil-external treatment fluid are placed within the at least one fracture.

Element 3: A method wherein the wellbore in the subterranean formation comprises a gravel packing screen creating an annulus between the wellbore and the gravel packing screen and wherein the oil-external treatment fluid comprising proppant particulates is introduced in the annulus between the wellbore and the gravel packing screen so as to place the proppant particulates therein.

Element 4: A method wherein the surface modification agent is selected from the group consisting of a non-aqueous tackifying agent; an aqueous tackifying agent; a silyl-modified polyamide compound; a surface modification agent emulsion; a binder; and any combination thereof.

Element 5: A method wherein at least a portion of the proppant particulates comprise degradable particulates.

Element 6: A method wherein the surface modification agent is coated onto the proppant particulates.

Element 7: A method wherein the surface modification agent is selected from the group consisting of a non-aqueous tackifying agent; an aqueous tackifying agent; a silyl-modified polyamide compound; a surface modification agent emulsion; a binder; and any combination thereof.

While any of the above combinations is specifically contemplated herein, some non-limiting examples of suitable combinations include: A with 1 and 2; A with 1 and 3; B with 1, 2, and 4; and C with 1, 3, and 4.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising treating a wellbore in a subterranean formation comprising:
   providing an oil-external treatment fluid,
      wherein the oil-external treatment fluid is a 3D-network comprising a chemical interaction between a hydrocarbon fluid, an aqueous fluid, and a surface modification agent, the surface modification agent present from about 0.01% to about 10% by weight of the oil-external treatment fluid;
   providing proppant particulates;
   suspending the proppant particulates in the oil-external treatment fluid; and
   introducing the oil-external treatment fluid comprising the proppant particulates into the wellbore in the subterranean formation.

2. The method of claim 1, wherein the chemical interaction between the hydrocarbon fluid, the aqueous fluid, and the surface modification agent is a Van der Waals interaction.

3. The method of claim 1, wherein the wellbore in the subterranean formation comprises at least one fracture and wherein the step of introducing the oil-external treatment fluid comprising the proppant particulates into the wellbore in the subterranean formation further comprises placing at least a portion of the proppant particulates into the at least one fracture.

4. The method of claim 1, wherein the wellbore in the subterranean formation comprises a gravel packing screen creating an annulus between the wellbore in the subterranean formation and the gravel packing screen, and the step of introducing the oil-external treatment fluid comprising the proppant particulates into the wellbore in the subterranean formation further comprises placing the proppant particulates in the annulus between the wellbore in the subterranean formation and the gravel packing screen.

5. The method of claim 1, wherein the surface modification agent is selected from the group consisting of a non-aqueous tackifying agent; an aqueous tackifying agent; a silyl-modified polyamide compound; a surface modification agent emulsion; a binder; and any combination thereof.

6. The method of claim 1, wherein at least a portion of the proppant particulates comprise degradable particles.

7. A method comprising treating a wellbore in a subterranean formation comprising:
   providing an oil-external treatment fluid,
      wherein the oil-external treatment fluid is a 3D-network comprising a chemical interaction between a hydrocarbon fluid, an aqueous fluid, and a surface modification agent coated onto proppant particulates, the surface modification agent present from about 0.01% to about 10% by weight of the oil-external treatment fluid; and
   introducing the oil-external treatment fluid into the wellbore in the subterranean formation.

8. The method of claim 7, wherein the chemical interaction between the hydrocarbon fluid, the aqueous fluid, and the surface modification agent coated proppant particulates is a Van der Waals interaction.

9. The method of claim 7, wherein the wellbore in the subterranean formation comprises at least one fracture and wherein the step of introducing the oil-external treatment fluid into the wellbore in the subterranean formation further comprises placing at least a portion of the proppant particulates coated with the surface modification agent into the at least one fracture.

10. The method of claim 7, wherein the wellbore in the subterranean formation comprises a gravel packing screen creating an annulus between the wellbore in the subterranean formation and the gravel packing screen, and the step of introducing the oil-external treatment fluid into the wellbore in the subterranean formation further comprises placing at least a portion of the proppant particulates coated with the surface modification agent through the annulus between the wellbore in the subterranean formation and the gravel packing screen.

11. The method of claim 7, wherein the surface modification agent is selected from the group consisting of a non-aqueous tackifying agent; an aqueous tackifying agent; a silyl-modified polyamide compound; a surface modification agent emulsion; a binder; and any combination thereof.

12. A method comprising treating a wellbore in a subterranean formation comprising:
   providing a hydrocarbon fluid;
   providing aqueous fluid;
   providing a surface modification agent;
   providing proppant particulates;
   providing a hydrojetting tool connected to a tubular member within the wellbore in the subterranean formation, so as to create an annulus between the tubular member and the wellbore in the subterranean formation;
   introducing the surface modification agent into the hydrocarbon fluid or the aqueous fluid;
   introducing the proppant particulates into the hydrocarbon fluid or the aqueous fluid;
   introducing one of the hydrocarbon fluid or the aqueous fluid into the wellbore in the subterranean formation through the hydrojetting tool and introducing the other of the hydrocarbon fluid or the aqueous fluid into the wellbore in the subterranean formation through the annulus between the tubular member and the wellbore in the subterranean formation; and
   contacting the hydrocarbon fluid and the aqueous fluid within the wellbore in the subterranean formation, so as to create an oil-external treatment fluid that is a 3D-network comprising a chemical interaction between the hydrocarbon fluid, the aqueous fluid, and the surface modification agent, the surface modification agent present from about 0.01% to about 10% by weight of the oil-external treatment fluid,
      wherein the oil-external treatment fluid is capable of suspending the proppant particulates.

13. The method of claim 12, wherein the surface modification agent is added to the hydrocarbon fluid and introduced into the wellbore in the subterranean formation through the hydrojetting tool and wherein the proppant particulates are added to the aqueous fluid and introduced into the wellbore in the subterranean formation through the annulus between the tubular member and the wellbore in the subterranean formation.

14. The method of claim 12, wherein the surface modification agent is added to the aqueous fluid and introduced into the wellbore in the subterranean formation through the hydrojetting tool and wherein the proppant particulates are added to the hydrocarbon fluid and introduced into the wellbore in the subterranean formation through the annulus between the tubular member and the wellbore in the subterranean formation.

15. The method of claim 12, wherein the surface modification agent is added to the hydrocarbon fluid and introduced into the wellbore in the subterranean formation through the annulus between the tubular member and the wellbore in the subterranean formation and wherein the proppant particulates are added to the aqueous fluid and introduced into the wellbore in the subterranean formation through the hydrojetting tool.

16. The method of claim 12, wherein the surface modification agent is added to the aqueous fluid and introduced into the wellbore in the subterranean formation through the annulus between the tubular member and the wellbore in the subterranean formation and wherein the proppant particulates are added to the hydrocarbon fluid and introduced into the wellbore in the subterranean formation through the hydrojetting tool.

17. The method of claim 12, wherein the chemical interaction between the hydrocarbon fluid, the aqueous fluid, and the surface modification agent is a Van der Waals type interaction.

18. The method of claim 12, wherein the wellbore in the subterranean formation comprises at least one fracture and wherein the step of contacting the hydrocarbon fluid or the aqueous fluid within the wellbore in the subterranean formation occurs at least one fracture, so as to place the proppant particulates therein.

19. The method of claim 12, wherein the step of contacting the hydrocarbon fluid or the aqueous fluid within the wellbore in the subterranean formation causes the surface modification agent to be coated onto the proppant particulates.

20. The method of claim 12, wherein the surface modification agent is selected from the group consisting of a non-aqueous tackifying agent; an aqueous tackifying agent; a silyl-modified polyamide compound; a surface modification agent emulsion; a binder; and any combination thereof.

* * * * *